(12) United States Patent
Yamada (10) Patent No.: US 11,899,668 B2
(45) Date of Patent: Feb. 13, 2024

(54) DATABASE MANAGEMENT APPARATUS, DATABASE CONTROL METHOD AND PROGRAM

(71) Applicant: International Business Machines Corporation, Armonk, NY (US)

(72) Inventor: Masatoshi Yamada, Shibuya-Ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1150 days.

(21) Appl. No.: 14/329,621

(22) Filed: Jul. 11, 2014

(65) Prior Publication Data

US 2015/0046487 A1     Feb. 12, 2015

(30) Foreign Application Priority Data

Aug. 12, 2013  (JP) .................... 2013-167887

(51) Int. Cl.
*G06F 16/27*     (2019.01)
*G06F 16/2455*   (2019.01)

(52) U.S. Cl.
CPC .................... *G06F 16/24564* (2019.01)

(58) Field of Classification Search
CPC ........... G06F 16/2428; G06F 16/24564; G06F 16/289; G06F 16/9535
See application file for complete search history.

(56) References Cited

U.S. PATENT DOCUMENTS

| 5,204,939 | A  | * | 4/1993  | Yamazaki ......... G06N 5/003 706/50 |
| 6,085,191 | A  |   | 7/2000  | Fisher et al. |
| 6,141,662 | A  |   | 10/2000 | Jeyachandran |
| 6,147,976 | A  | * | 11/2000 | Shand ............... H04L 61/35 370/254 |
| 6,161,139 | A  | * | 12/2000 | Win ................. G06F 21/604 709/223 |
| 6,236,996 | B1 |   | 5/2001  | Bapat et al. |
| 6,275,824 | B1 |   | 8/2001  | O'Flaherty et al. |
| 7,409,390 | B2 |   | 8/2008  | Kudoh et al. |
| 7,620,630 | B2 | * | 11/2009 | Lloyd ............... G06F 16/10 707/999.005 |
| 8,606,626 | B1 | * | 12/2013 | DeSoto ............. G06Q 30/0269 705/7.29 |
| 8,805,883 | B1 | * | 8/2014  | Vaughn ............. G06F 16/9535 707/784 |
| 2002/0055921 | A1 |   | 5/2002 | Yoshimura et al. |

(Continued)

FOREIGN PATENT DOCUMENTS

JP      04-321143      11/1992
JP      H10269121 A    10/1998

(Continued)

*Primary Examiner* — Tarek Chbouki
(74) *Attorney, Agent, or Firm* — CUENOT, FORSYTHE & KIM, LLC (57) ABSTRACT

Database management includes processing a database object in accordance with a processing request, determining a mode of processing from the processing request, and, responsive to determining that the mode of processing satisfies an application condition, changing content of the processing in accordance with a rule associated with the application condition using a processor.

15 Claims, 8 Drawing Sheets

(56) References Cited

U.S. PATENT DOCUMENTS

| | | | | |
|---|---|---|---|---|
| 2002/0077803 A1* | 6/2002 | Kudoh | ................ | G06F 21/6218 |
| | | | | 704/1 |
| 2002/0095405 A1* | 7/2002 | Fujiwara | ............. | G06F 21/6227 |
| 2003/0110131 A1 | 6/2003 | Alain et al. | | |
| 2004/0139043 A1* | 7/2004 | Lei | ....................... | G06F 21/6227 |
| 2005/0144176 A1* | 6/2005 | Lei | ....................... | G06F 21/6227 |
| 2006/0004740 A1* | 1/2006 | Dettinger | ............ | G06F 16/2423 |
| 2006/0129809 A1 | 6/2006 | Battagin et al. | | |
| 2006/0248083 A1* | 11/2006 | Sack | .................... | G06F 21/6218 |
| | | | | 707/999.009 |
| 2006/0248599 A1* | 11/2006 | Sack | ..................... | H04L 63/102 |
| | | | | 707/999.009 |
| 2008/0288332 A1* | 11/2008 | Altounian | .......... | G06Q 30/0601 |
| | | | | 705/26.4 |
| 2009/0006283 A1* | 1/2009 | Labrie | ................... | G06F 16/215 |
| | | | | 706/12 |
| 2009/0292711 A1* | 11/2009 | Konik | ............... | G06F 16/24565 |
| 2011/0173220 A1* | 7/2011 | Jung | ..................... | G06Q 10/06 |
| | | | | 707/769 |
| 2013/0086088 A1* | 4/2013 | Alton | .................. | G06F 16/2455 |
| | | | | 707/754 |
| 2014/0149747 A1* | 5/2014 | Bowers | ................... | G06F 21/44 |
| | | | | 726/28 |
| 2015/0046487 A1* | 2/2015 | Yamada | ............ | G06F 16/24564 |
| | | | | 707/769 |
| 2015/0242531 A1* | 8/2015 | Rodniansky | ........ | G06F 21/6218 |
| | | | | 707/782 |
| 2017/0118216 A1* | 4/2017 | Roth | ....................... | H04L 67/10 |

FOREIGN PATENT DOCUMENTS

| | | |
|---|---|---|
| JP | 11-282740 A | 10/1999 |
| JP | 2000-035949 A | 2/2000 |
| JP | 2000-047924 A | 2/2000 |
| JP | 2000-112796 A | 4/2000 |
| JP | 2002091816 A | 3/2002 |
| JP | 2002-149468 A | 5/2002 |
| JP | 2002-215440 A | 8/2002 |
| JP | 2002342376 A | 11/2002 |
| JP | 2003-228519 A | 8/2003 |
| JP | 2006-040186 A | 2/2006 |
| JP | 2006513499 A | 4/2006 |
| JP | 2006164268 A | 6/2006 |
| JP | 2006323688 A | 11/2006 |
| JP | 2006277179 A | 12/2006 |
| JP | 2007-018309 A | 1/2007 |
| JP | 2007-109016 A | 4/2007 |
| JP | 2009-151581 A | 7/2009 |
| JP | 2011059254 A | 3/2011 |
| JP | 2013008121 A | 1/2013 |

* cited by examiner

| COLUMN | Col1 | Col2 | Col3 |
|--------|------|------|------|
| DATA | A1 | A2 | A3 |
| DATA | B1 | B2 | B3 |
| DATA | C1 | C2 | C3 |

Figure 3

| | APPLICATION CONDITION | EXECUTION RULE |
|---|---|---|
| RULE a | Table1, WHERE(Col1, Col2) | Table1=R, Col1=R, Col2=R, Col3=R |
| RULE b | Table1, WHERE(Col1) | Table1=R, Col1=R, Col2=M(XX), Col3=R |
| RULE c | Table1, WHERE() | Table1=E |

| CLIENT NUMBER | NAME | ADDRESS | PHONE NUMBER | GENDER | BIRTHDAY | INCOME | CARD NUMBER | PASSWORD |
|---|---|---|---|---|---|---|---|---|
| 0001 | ICHIGO YASUO | TOKYO-TO | 03-1234-0001 | WOMAN | JANUARY 1 | 6 MILLION | 1234-5678-0001 | AAAA |
| 0002 | JIRO ISHIO | TOKYO-TO | 03-1234-0002 | MAN | FEBRUARY 2 | 5 MILLION | 1234-5678-0002 | BBBB |
| 0003 | SABURO UO | CHIBA PREFECTURE | 03-1234-0003 | MAN | MARCH 3 | 8 MILLION | 1234-5678-0003 | CCCC |
| 0004 | SHIRO TOO | SAITAMA PREFECTURE | 03-1234-0004 | MAN | APRIL 4 | 4.5 MILLION | 1234-5678-0004 | DDDD |
| 0005 | GORO KASAO | TOKYO-TO | 03-1234-0005 | MAN | MAY 5 | 5 MILLION | 1234-5678-0005 | EEEE |
| 0006 | ROKURO KIO | KANAGAWA PREFECTURE | 03-1234-0006 | MAN | JUNE 6 | 10 MILLION | 1234-5678-0006 | FFFF |
| 0007 | NANAKO KURIO | TOKYO-TO | 03-1234-0007 | WOMAN | JULY 7 | 1 MILLION | 1234-5678-0007 | GGGG |

Figure 6

| | APPLICATION CONDITION SIZE | MAXIMUM NUMBER OF LINES | SQL | EXECUTION RULE |
|---|---|---|---|---|
| RULE 1 | | | SELECT TABLE (CLIENT), WHERE(CLIENT NUMBER AND PASSWORD) | PASSWORD=N |
| RULE 2 | | | SELECT TABLE (CLIENT), WHERE(CLIENT NUMBER) | PHONE NUMBER=M(00), INCOME=N, CARD NUMBER=N, PASSWORD=N |
| RULE 3 | | | SELECT TABLE (CLIENT), WHERE(ADDRESS) | CLIENT NUMBER=N, NAME=N, CARD NUMBER=N, PASSWORD=N |
| RULE 4 | | | SELECT TABLE (CLIENT) | TABLE=E |
| RULE 5 | ROWS(>=1) | | SELECT TABLE (CLIENT) | PASSWORD=N |
| RULE 6 | ROWS(>=3) | | SELECT TABLE (CLIENT) | CLIENT NUMBER=N, NAME=N, PHONE NUMBER =M(00), CARD NUMBER=N, PASSWORD=N |
| RULE 7 | | MAX(3) | SELECT COL(PHONE NUMBER), TABLE(CLIENT NUMBER) | |

Figure 7

| | APPLICATION CONDITION SIZE | MAXIMUM NUMBER OF LINES | SQL | EXECUTION RULE |
|---|---|---|---|---|
| RULE 8 | | | SELECT TABLE(CLIENT), WHERE(ADDRESS) | CLIENT NUMBER=N, NAME=N, PHONE NUMBER=N, BIRTHDAY=N, INCOME=N, CARD NUMBER=N, PASSWORD=N |
| RULE 9 | | | SELECT TABLE(CLIENT), WHERE(GENDER='MAN') | CLIENT NUMBER=N, NAME=N, ADDRESS=N, PHONE NUMBER=N, GENDER=N, BIRTHDAY=N, CARD NUMBER=N, PASSWORD=N |
| RULE 10 | | | SELECT TABLE(CLIENT), WHERE(GENDER='WOMAN') | CLIENT NUMBER=N, NAME=N, ADDRESS=N, PHONE NUMBER=N, GENDER=N, INCOME=N, CARD NUMBER=N, PASSWORD=N |

Figure 8

DATABASE MANAGEMENT APPARATUS, DATABASE CONTROL METHOD AND PROGRAM

BACKGROUND

In general, data access control in a database system may be implemented by combining control of access rights set for accounts of a database, filtering data sets obtained as a result of a search result, and the like. An access right for an account specifies an accessible database object (data, a table, or data or a set of data such as a record or a column; hereinafter referred to simply as "an object") and content of permitted operations (reading, writing, update) for each account.

In some cases, systems include a database management system for storing data into multiple database tables as well as taking out data from the tables. The data in the database tables can be controllably accessed in accordance with privacy parameters stored in the database tables. The systems may also include a database management system interface which is operationally combined with the database management system to control access to the data in the database tables in accordance with the privacy parameters. Such systems may also include a monitoring module which is communicably combined with the database management system interface to effectively apply the data privacy parameters in the database management system.

In other cases, systems prevent in database access control based on the attribute information such as user attributes, performance deterioration of a data access program for accessing a database by reducing a management load in the case of attribute information being changed. In such systems, a context storing section stores the attribute information about users and the like that access a data object acquired from an attribute management server. A policy function storing section stores a policy function which generates a control condition in accordance with the attribute information stored in the context storing section. A function executing section executes the policy function when a user accesses a data object with the data access program. A control condition adding section adds a control condition generated by the policy function to the data access program. An execution section executes the data access program to which the control condition is added.

SUMMARY

A method includes processing a database object in accordance with a processing request, determining a mode of processing from the processing request, and, responsive to determining that the mode of processing satisfies an application condition, changing content of the processing in accordance with a rule associated with the application condition using a processor.

A method for controlling access to a database includes judging whether processing based on an accepted processing request satisfies an application condition based on a predetermined mode of processing, executing the processing for a database object stored in the database, in accordance with the processing request, and performing, using a processor, conversion for a processing result obtained by executing the processing, in accordance with a rule determined in association with the application condition satisfied by the processing.

A method for controlling access to a database includes judging whether processing based on an accepted processing request satisfies an application condition based on a predetermined mode of processing and performing conversion for the processing request in accordance with a rule determined in association with the application condition satisfied by the processing. The method includes executing, for the processing request which satisfies the application condition, processing for the database object stored in the database in accordance with the processing request which has been converted using a processor.

A system includes a processor programmed to initiate executable operations. The executable operations include processing a database object in accordance with a processing request, determining a mode of processing from the processing request, and, responsive to determining that the mode of processing satisfies an application condition, changing content of the processing in accordance with a rule associated with the application condition.

A computer program product includes a computer readable storage medium having program code stored thereon. The program code is executable by a processor to perform a method. The method includes processing a database object in accordance with a processing request using the processor, determining, using the processor, a mode of processing from the processing request, and, responsive to determining that the mode of processing satisfies an application condition, changing content of the processing in accordance with a rule associated with the application condition using the processor.

DETAILED DESCRIPTION

The present invention relates to a database characterized in data access control, a method for controlling the database, and a program.

Access control in a conventional database system is implemented mainly by setting data access right for accounts. Therefore, if data is accessed in accordance with an access right set for an account, it is not possible to restrict the access irrespectively of the mode of the access because the access right itself is correct. Therefore, it is difficult to restrict abnormal access such as access for readout of bulk information that would not be usually required to be simultaneously read out.

The inventive arrangements described herein facilitate advanced access control that is not dependent on rights of accounts.

In one aspect, the inventive arrangements may be implemented as an apparatus as shown below. The apparatus is an apparatus for managing a database and includes: an object storing section storing a database object; a processing executing section executing processing for the database object stored in the object storing section in accordance with a processing request; a rule storing section holding an application condition based on a mode of the processing by the processing executing section and a rule for changing content of the processing in association with each other; and a rule applying section changing, when a mode of processing based on the processing request satisfies the application condition held in the rule storing section, content of the processing executed by the processing executing section in accordance with the rule associated with the satisfied application condition.

More specifically, if the mode of the processing based on the processing request satisfies a predetermined application condition, and the rule corresponding to the satisfied application condition is a rule for making a change so that a result of the processing by the processing executing section is not outputted, the rule applying section cancels execution of the processing based on the processing request by the processing executing section.

More specifically, if a mode of readout processing based on a data readout request specifying an item to be read out satisfies a predetermined application condition, and the rule corresponding to the application condition is a rule for making a change so that a data readout result of a particular item is not outputted, the rule applying section changes the processing based on the processing request so that readout of the data by the processing executing section is not performed.

If the mode of the processing based on the processing request satisfies a predetermined application condition, the rule applying section outputs, instead of data obtained as a result of the processing by the processing executing section, information about the data, in accordance with the rule corresponding to the satisfied application condition.

Furthermore, if the mode of the processing based on the processing request satisfies a predetermined application condition, the rule applying section deletes data minus a predetermined amount from the data obtained as a result of the processing by the processing executing section thereby to output the predetermined amount of data, in accordance with the rule corresponding to the satisfied application condition.

An embodiment of the present invention can also be implemented as a method as shown below. A method for controlling access to a database includes the steps of: judging whether processing based on an accepted processing request satisfies an application condition based on a predetermined mode of processing; executing the processing for a database object stored in the database, in accordance with the processing request; and performing conversion for a processing result obtained by executing the processing, in accordance with a rule determined in association with the application condition satisfied by the processing.

Alternatively, a method for controlling access to a database includes the steps of: judging whether processing based on an accepted processing request satisfies an application condition based on a predetermined mode of processing; performing conversion for the processing request in accordance with a rule determined in association with the application condition satisfied by the processing; and executing, for the processing request which does not satisfy the application condition, processing for a database object stored in the database in accordance with the processing request, and executing, for the processing request which satisfies the application condition, processing for the database object stored in the database in accordance with the processing request which has been converted.

Furthermore, an embodiment of the present invention may be implemented as a program controlling a computer to implement each of the functions of the apparatus described above or a program causing a computer to execute processing corresponding to each of the steps described above. It is possible to provide the program by distributing the program stored in a magnetic disk, an optical disk, a semiconductor memory or other recording media or by distributing the program via a network.

According to an embodiment of the present invention, it is possible to achieve advanced access control not depending on rights of accounts.

An embodiment of the present invention will be described below in detail with reference to accompanying drawings.

Figure 1:
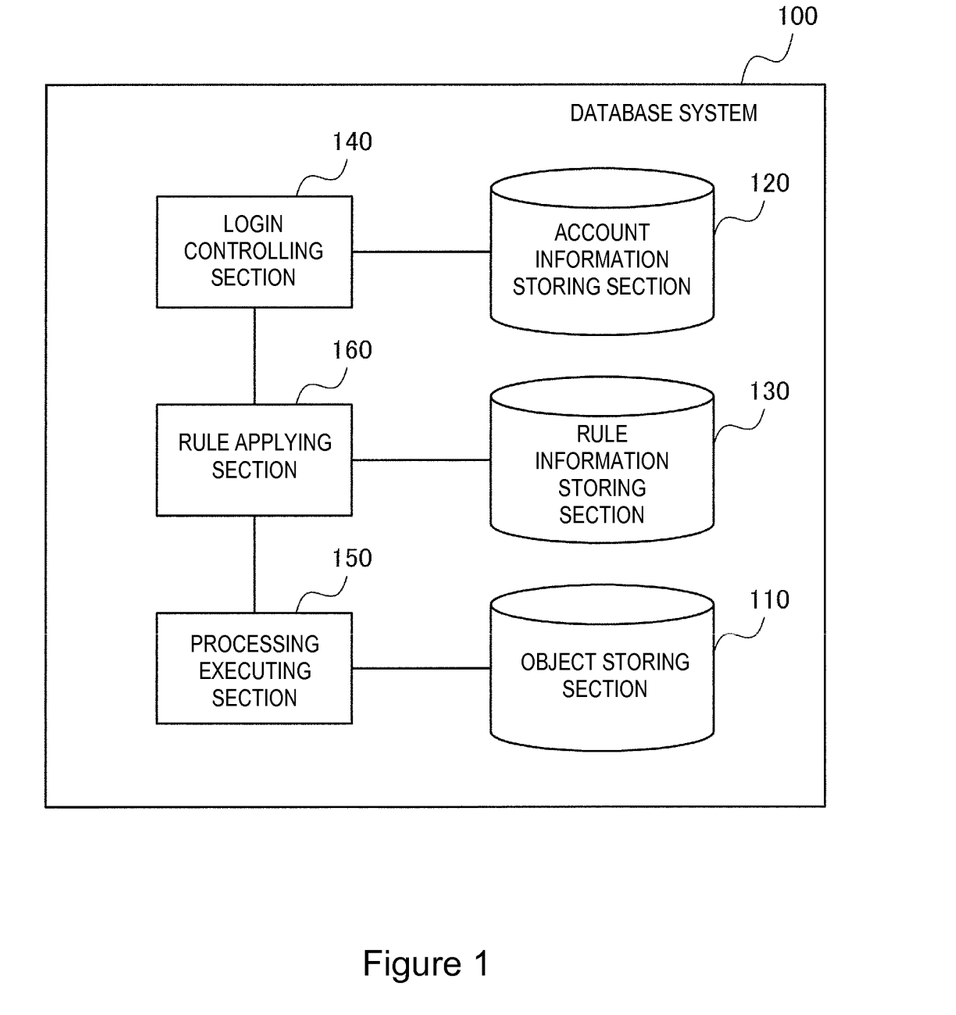
FIG. 1 is a diagram showing an example of a functional configuration of a database system to which an embodiment of the present invention is applied.

FIG. 1 is a diagram showing an example of a functional configuration of a database system to which a present embodiment is applied. A database system (server) 100 of the present embodiment shown in FIG. 1 includes an object storing section 110, an account information storing section 120 and a rule information storing section 130 as information storing means. A login controlling section 140, a processing executing section 150 and a rule applying section 160 are provided as processing executing means.

The object storing section 110 stores an object such as a table and a view table. The object stored in the object storing section 110 is similar to general objects handled in existing database systems.

The account information storing section 120 holds information on accounts authorized to access the object stored in the object storing section 110. The information held in the account information storing section 120 is similar to account information in existing database systems. For example, an access-permitted object and permitted operation content are set for each account.

The rule information storing section 130 holds rules for access to the object stored in the object storing section 110. The access rules held in the rule information storing section 130 provide the way of performing processing for the object, unlike the access right set for the accounts and held in the account information storing section 120. Specifically, the content of processing as a condition for applying a rule is associated with an execution rule for a result of processing satisfying the application condition. Therefore, irrespective of the content of an access right of an account (in other words, irrespective of no matter who made a processing request, processing for the object can be performed only by a mode in accordance with an access rule stored in the rule information storing section 130. Specific content of the access rules and details of applying the access rules to a processing request will be described later.

The login controlling section 140 accepts a login request from a client and performs user authentication. Specifically, for example, an account name and a password are acquired from the login request and are collated with the account information held in the account information storing section 120. Then, if it is confirmed that the account is a correct account, login is permitted. This function is similar to a login control function in existing database systems and the like.

The processing executing section 150 accepts a processing request from the logged-in client and executes processing for the object stored in the object storing section 110 in accordance with the accepted processing request. Specifically, an operation such as reading from, writing into and update of the object is performed within a range of an access right set for the account. The processing request can be received from an external client apparatus connected via a network or the like or can be inputted by an operator operating an input device (such as a keyboard) of the database system 100.

The rule applying section 160 judges whether or not processing to be executed by the processing executing section 150 (processing based on the processing request from the client) satisfies an application condition for an access rule held in the rule information storing section 130. In the case of the processing satisfying an application condition for an access rule, the content of the processing according to the processing request is converted in accordance with an execution rule corresponding to the application condition. Thereby, the processing executing section 150 performs the processing for the object in a mode in accordance with the access rule. Details of the functions and operations of the rule applying section 160 will be described later.

Figure 2:
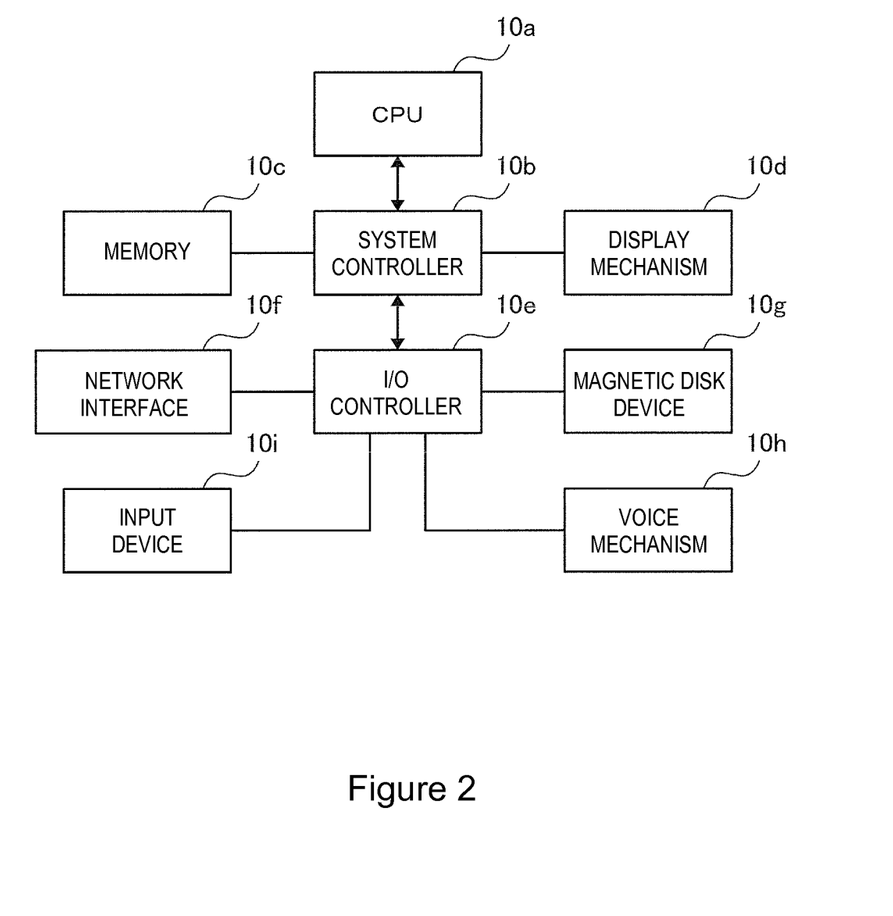
FIG. 2 is a diagram showing an example of a hardware configuration for configuring the database system in accordance with an embodiment of the present invention.

FIG. 2 is a diagram showing an example of a hardware configuration for configuring the database system 100 in accordance with an embodiment of the present invention. Here, its application to a computer will be described. The computer shown in FIG. 2 includes a CPU (Central Processing Unit) 10*a* which is an operation means, and a memory 10*c* which is a main storage means. The computer is also provided with a magnetic disk device (HDD: Hard Disk Drive) 10*g*, a network interface 10*f*, a display mechanism 10*d* including a display device, a voice mechanism 10*h*, an input device 10*i* such as a keyboard and a mouse, and the like as external devices.

In the configuration example shown in FIG. 2, the memory 10*c* and the display mechanism 10*d* are connected to the CPU 10*a* via a system controller 10*b*. The network interface 10*f*, the magnetic disk device 10*g*, the voice mechanism 10*h* and the input device 10*i* are connected to the system controller 10*b* via an I/O controller 10*e*. The components are connected to one another via various kinds of buses such as a system bus and an input/output bus.

FIG. 2 shows a computer hardware configuration preferable for applying the present embodiment merely as an example. The present embodiment can be widely applied to information processing apparatuses functioning as a database system which accepts a request for processing for an object and performs the processing for the object. It is not meant that the present embodiment is implemented only in the configuration shown in FIG. 2.

In FIG. 2, the magnetic disk device 10*g* stores an OS program and application programs. By the programs being read into the memory 10*c* and executed by the CPU 10*a*, each of the functions of the login controlling section 140, the processing executing section 150 and the rule applying section 160 in the present embodiment is implemented. The object storing section 110, the account information storing section 120 and the rule information storing section 130 are implemented by storage means such as the memory 10*c* and the magnetic disk device 10*g*. Magnetic disk device 10*g* and memory 10*c* are examples of computer readable storage media. The term "computer readable storage media" means non-transitory computer readable storage media.

Figure 3:
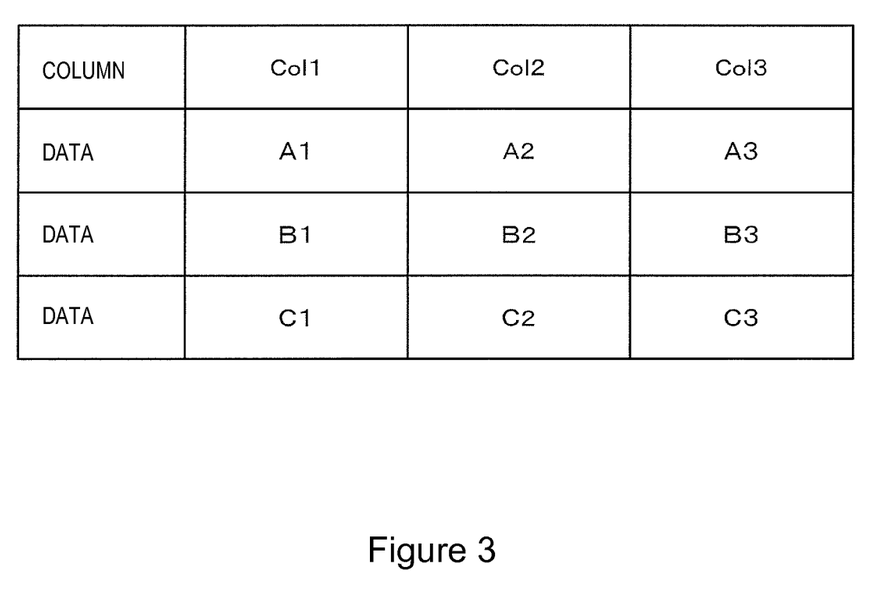
FIG. 3 is a diagram showing an example of a table object.
Figure 4:
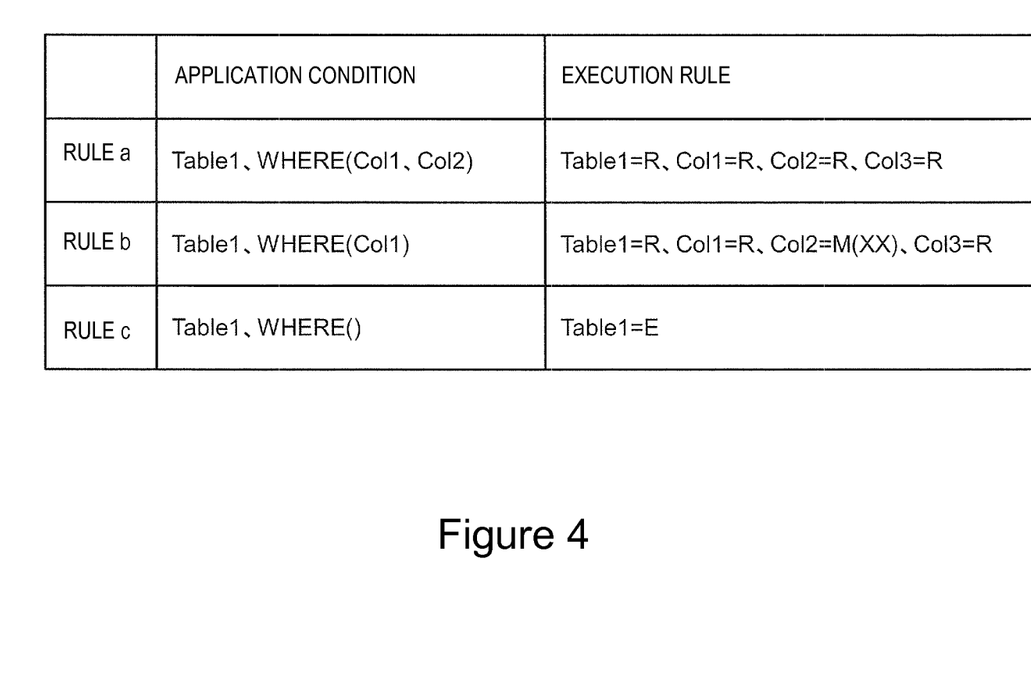
FIG. 4 is a diagram showing an example of access rules.

A process for applying an access rule by the rule applying section 160 will be described. FIG. 3 is a diagram showing an example of a table which is an object. FIG. 4 is a diagram showing an example of access rules.

In the example shown in FIG. 3, data is stored in each of three columns of "Col1", "Col2" and "Col3" of a table "Table1". In the example shown in FIG. 4, three kinds of application conditions and execution rules are provided as access rules with regard to a case where a data readout request is made as a processing request. Specifically, a rule a provides that the data of "Col1", "Col2" and "Col3" in "Table1" should be read out on the application condition that a readout request specifying the values of "Col1" and "Col2" has been made for "Table1". A rule b provides that only the data of "Col1" and "Col3" in "Table1" should be read out, and the data of "Col2" should not be read out but masked (hidden) on the application condition that a readout request specifying only the value of "Col1" has been made for "Table1". A rule c provides that data read out from "Table1" should not be outputted (regarding it as an error) on the application condition that a readout request not specifying any column value has been made for "Table1".

Here, it is assumed that data readout requests have been performed by the following three kinds of SQL sentences.

Request 1: SELECT * FROM Table1 WHERE Col1='A1' AND Col2='A2'

Request 2: SELECT * FROM Table1 WHERE Col1='A2'

Request 3: SELECT * FROM Table1

The request 1 is a request for readout of data of a row in which the value of "Col1" is "A1" and the value of "Col2" is "A2". In this case, if the processing executing section 150 merely performs processing based on this readout request without applying an access rule, the data of the row in which the value of "Col1" is "A1" and the value of "Col2" is "A2" is read out. Then, as a processing result, "A1, A2, A3" is obtained. On the other hand, according to the access rules shown in FIG. 4, this request 1 satisfies the application condition for the rule a. Therefore, the data of "Col1", "Col2" and "Col3" in the row where the value of "Col1" is "A1" and the value of "Col2" is "A2" is read out. Thereby, as a processing result, "A1, A2, A3" is obtained again similarly to the case where the access rule is not applied.

The request 2 is a request for readout of data of a row on which the value of "Col1" is "A1". In this case, if the processing executing section 150 merely performs processing based on this readout request without applying an access rule, the data of the row on which the value of "Col1" is "A1" is read out. A processing result, "A1, A2, A3" is thus obtained. On the other hand, according to the access rules shown in FIG. 4, this request 2 satisfies the application condition for the rule b. Therefore, the data of "Col1" and "Col3" in the row where the value of "Col1" is "A1" is read out, and the data of "Col2" is masked (given a meaningless output value "XX"). Thereby, as a processing result, "A1, XX, A3" is obtained.

The request 3 is a readout request made without specifying any column value. In this case, if the processing executing section 150 merely performs processing based on this readout request without applying an access rule, data of all the rows of "Table1" is read out. Then, as a processing result, "A1, A2, A3, B1, B2, B3, C1, C2, C3" is obtained. On the other hand, according to the access rules shown in FIG. 4, this request 3 satisfies the application condition for the rule c. Therefore, the above processing result is not outputted, and the processing results in "ERROR".

As described above, if the content of processing based on a processing request satisfies an application condition for an access rule according to the present embodiment, the content of the processing is converted in accordance with an execution rule. Therefore, a processing result is different than would be obtained in the case where the access rule is not applied. When the request 1 and the request 2 are compared, the same processing results are obtained if the access rule is not applied. However, different processing results are obtained by applying the access rule because an execution rule applied to the processing of the request 1 (the rule a) and an execution rule applied to the processing of the request 2 (the rule b) are different from each other. Here, the access rule described above is applied in accordance with only the content of processing based on a processing request (under which condition readout of data has been requested). That is, if the content of a processing request satisfies an application condition for an access rule, conversion of processing as described above is performed irrespective of the content of access right set for the account of a client that made the processing request.

In the above example, it is assumed that the data of "Col2" is not read out for the request 2 and that none of the data in "Table1" is read out for the request 3. However, it is possible to execute readout of the data and prevent appropriate data from being presented at the time of outputting a processing result. The content of the above control differs depending upon whether the processing by the rule applying section 160 is performed before or after the processing by the processing executing section 150, which will be described in detail later.

In the above example, data readout processing is targeted, and such processing conversion is performed to cancel readout of portion or an entirety of the data that would be read out only in accordance with the processing request. In the present embodiment, it is possible to implement various processing conversions in addition to the above example, by defining access rules. For example, in the above example described with reference to FIGS. 3 and 4, processing results in "ERROR" without readout data, for a readout request made with only "Table1" being specified. However, an execution rule may be provided that only the data of "Col3" (that is, only partial data) is not read out on the application condition that a similar readout request has been accepted. In this case, when the above request 3 is made, the processing result is "A1, A2, B1, B2, C1, C2". Here, the data of "Col3" which has not been read out is not masked (given the meaningless output value "XX").

It is also possible to perform not only conversion for canceling output of read-out data or data readout processing but also conversion of processing so that, instead of read-out data, information about the data (such as attribute information) is outputted. For example, an execution rule may be provided that, for the data of "Col3" (that is, for partial data), a result of judgment about whether or not the data corresponds to a particular value (for example, "A3") is outputted as a processing result, for a readout request made with only "Table 1" being specified. In this case, when the above request 3 is made, the processing result is "A1, A2, Yes, B1, B2, No, C1, C2, No".

An execution rule may be provided that, for the data of "Col3" (that is, for partial data), only a part of the value of the data (for example, the last three digits) is outputted as a processing result for a readout request made with only "Table 1" being specified. As an example, the following is assumed: "A3"="12345", "B3"="67890" and "C3"="98765". In this case, when the above request 3 is made, the processing result is "A1, A2, 345, B1, B2, 890, C1, C2, 765".

An execution rule may be provided that data is not read out for a readout request made with only the value of "Col1" being specified, while an execution rule may be provided that data is read out for a readout request made with the values of "Col1" and "Col2" being specified. In this case, when the above request 1 is made, the processing result is "A1, A2, A3". If the above request 2 is made, data is not read out.

An execution rule may be provided that data is not read out for a readout request for readout the data of "Col1" and "Col2" at the same time. In this case, when the above request 3 is made, it means that readout of the data of "Col1" and the data of "Col2" is requested, and, therefore, data is not read out. In comparison, when a request for readout the data of "Col1" and "Col3" is made, the processing result is "A1, A3, B1, B3, C1, C3". Similarly, when a request for readout the data of "Col2" and "Col3" is made, the processing result is "A2, A3, B2, B3, C2, C3".

In addition, for example, an execution rule may be provided that readout is performed if a quantity of data (for example, the number of rows) satisfying the condition of a readout request is not more than a predetermined amount, and is not if the predetermined amount is exceeded. In this case, an execution rule may be provided that, if data readout is not performed because the predetermined amount is exceeded, the number of data items satisfying the condition is informed as a processing result. An execution rule may be provided that, if a request for readout of data of a particular value, it is informed that the data of the value exists, instead of reading out the data. Furthermore, application conditions and execution rules may be defined not only for data readout processing but also for data writing processing and data update processing (for example, an execution rule that processing for writing not less than a predetermined data items at the same time are not executed, or the like). As described above, in the present embodiment, it is possible to define and use various access rules as appropriate, according to the kinds of data managed by the database system 100, operation conditions, specifications and the like of the database system 100.

In principle, application of an access rule by the rule applying section 160 can be performed after processing by the processing executing section 150 is performed. On the other hand, there may be a case where application of an access rule can be performed before processing by the processing executing section 150 is performed, depending on the application condition for a rule or the content of an execution rule. For example, consideration will be made on a case where an access rule is provided that a result of readout of data is not outputted for a readout request satisfying an application condition such as the rule c shown in FIG. 3. In this case, since readout of the data based on the readout request satisfying the application condition is unnecessary, it is more efficient to apply the access rule and convert the processing request before processing (readout of the data) by the processing executing section 150 without executing the processing itself. On the other hand, consideration will be made on a case where conversion of a processing result based on an execution rule is performed on the application condition that not less than a predetermined number of data items have been read out. In this case, it is possible to judge whether the application condition is satisfied or not (whether not less than the predetermined number of data items have been read out or not) only after the data items have been read out actually. Therefore, in this case, it is necessary to apply the access rule and convert the processing result after the processing by the processing executing section 150 is performed. Therefore, it is desirable to set, for each individual access rule, whether the access rule is to be applied before or after processing by the processing executing section 150, according to an application condition and the content of an execution rule.

Figure 5:
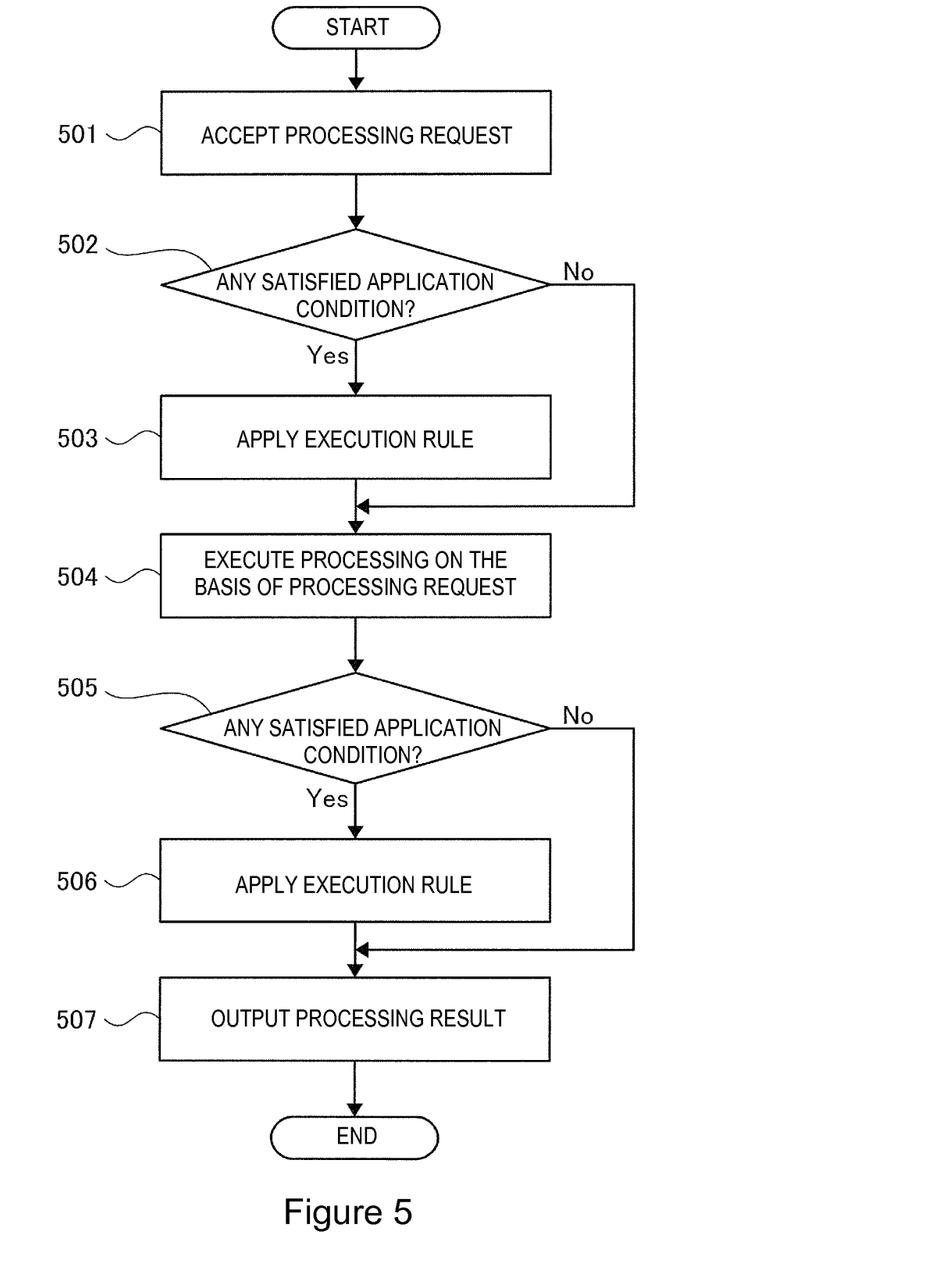
FIG. 5 is a flowchart illustrating a process procedure of a processing executing section and a rule applying section in the database system in accordance with an embodiment of the present invention.

FIG. 5 is a flowchart illustrating a process procedure of the processing executing section 150 and the rule applying section 160 in the database system 100 in accordance with an embodiment of the present invention. It is assumed that login processing by a client has been already performed as an initial state. In this operation example, it is assumed that both of an access rule to be applied prior to processing by the processing executing section 150 and an access rule to be applied after processing by the processing executing section 150 are provided.

As shown in FIG. 5, when the database system 100 accepts a processing request in the form of an SQL sentence or the like from the client (step 501), the rule applying section 160 judges, for the accepted processing request, whether or not the processing request satisfies an application condition for the access rule to be executed before execution of processing by the processing executing section 150 (step 502). Then, if the application condition satisfied by the processing request exists, an execution rule corresponding to the application condition is applied to convert the content of the processing request (step 503).

After that, the processing executing section 150 executes the processing in accordance with the processing request (or the converted processing request, if the execution rule has been applied at step 503) (step 504). Next, the rule applying section 160 judges whether or not this processing request satisfies an application condition for the access rule, in accordance with a result of the processing by the processing executing section 150 (step 505). Then, if the application condition satisfied by the processing request exists, an execution rule corresponding to the application condition is applied to convert the content of the processing result (step 506). Then, the processing executing section 150 outputs the obtained processing result (or the converted processing result, if the execution rule has been applied at step 506) (step 507).

Figure 6:
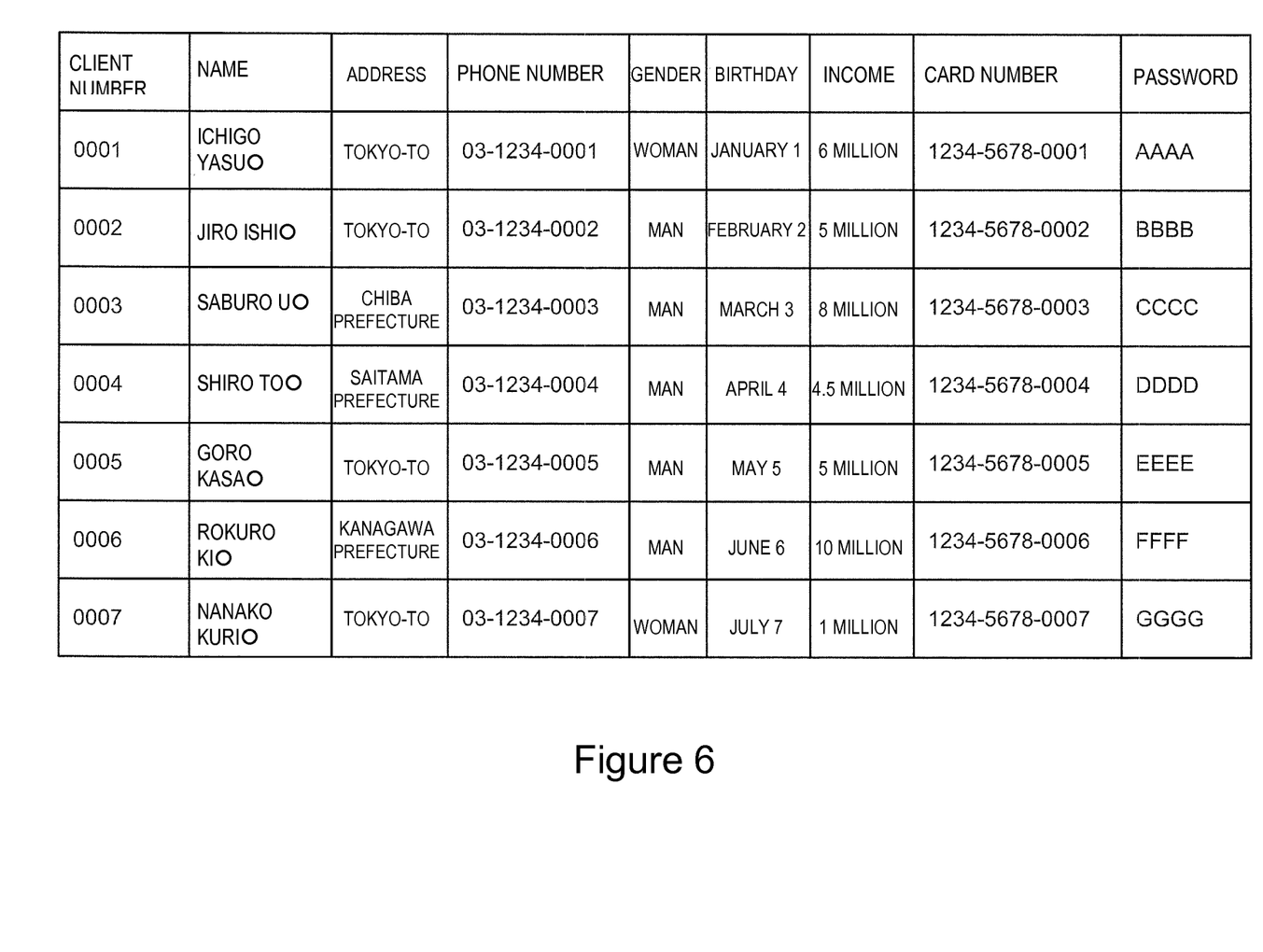
FIG. 6 is diagram showing a configuration example of a table "table of clients" targeted in the present application example.
Figure 7:
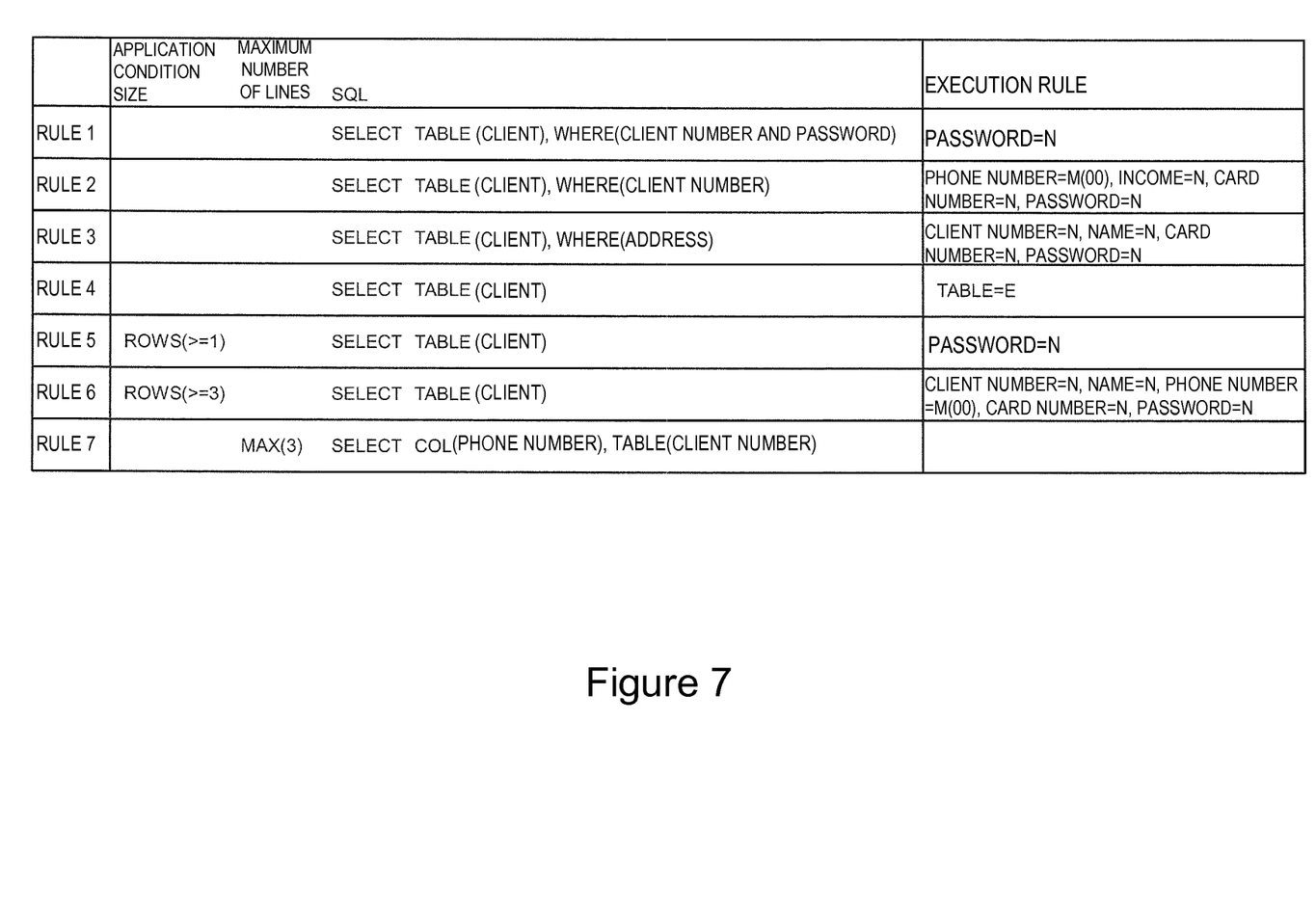
FIG. 7 is a diagram showing a configuration example of access rules used in the present application example.

Next, a more detailed application example of the present embodiment will be described. FIG. 6 shows a configuration example of a table "table of clients" which is an object to be a processing target in the present application example. FIG. 7 shows a configuration example of access rules used in the present application example. In the "table of clients" shown in FIG. 6, data is stored in each of columns of "client number", "name", "address", "phone number", "gender", "birthday", "income", "card number" and "password". Among the access rules shown in FIG. 7, an application condition is set with regard to specification of a column, for rules 1 to 4; and an application condition is set in accordance with the data size (the number of data items) of a processing result, for rules 5 to 7.

The access rules shown in FIG. 7 will be described more specifically. As for rule 1, an execution rule is provided that the value of "password" is to be "NULL" (not to be displayed) for a readout request specifying the values of "client number" and "password" and targeting "table of clients" (application condition). As for rule 2, an execution rule is provided that the value of "phone number" is to be masked (a meaningless value given), and the values of "income", "card number" and "password" are to be "NULL" (not to be displayed) for a readout request specifying the value of "client number" and targeting "table of clients" (application condition). As for rule 3, an execution rule is provided that the values of "client number", "name", "card number" and "password" are to be "NULL" (not to be displayed) for a readout request specifying the value of "address" and targeting "table of clients" (application condition). As for rule 4, an execution rule is provided that processing is not to be executed (thus the processing results in "ERROR") for a readout request for readout all data from the targeted "table of clients" (application condition). Therefore, as for the rules 1 to 4, it is possible to perform application of the access rule to a processing request by the rule applying section 160 before execution of processing by the processing executing section 150 to change the processing so that, for the items for which the "NULL" value is to be outputted, data readout itself is not performed.

As for rule 5, an execution rule is provided that, when one or more data sets (rows of the "table of clients") are acquired as a processing result (application condition), the value of "password" in the data sets is to be "NULL" (not to be displayed). As for rule 6, an execution rule is provided that, when three or more data sets are acquired as a processing result (application condition), the values of "client number", "name", "card number" and "password" in the data sets are to be "NULL" (not to be displayed), and the value of "phone number" is to be masked (a meaningless value given). As for rule 7, an execution rule is provided that, in readout of data sets targeting the object "phone number" and the object "table of clients" for a processing result, the maximum number of data sets that can be acquired (outputted) is three. Therefore, as for the rules 5 to 7, it is possible to perform application of the access rule to a processing request by the rule applying section 160 after execution of processing by the processing executing section 150 to change the processing so that deletion or replacement of read-out data is performed.

In the present application example, as for access rules which can be applied in an overlapping manner, only an access rule with the highest satisfaction degree is applied in order to avoid execution of useless or overlapped processing for improving processing efficiency. The access rule with the highest satisfaction degree is such an access rule that includes items of application condition (condition items) for another access rules and that more condition items satisfy the processing request. For example, among the access rules shown in FIG. 7, the condition items of rule 1 include the condition items of rule 2, and rule 1 has more condition items. Therefore, a processing request satisfying rule 1 necessarily satisfies rule 2 as well. In such a case, only rule 1 is applied, and thus rule 2 is not applied. This means that, if multiple access rules are satisfied, such an access rule is given higher priority that the number of data sets acquired as a processing result is smaller.

In the present application example, separately from the above description, the highest priority is applied to an access rule that processing is not performed (or a processing result is not outputted) when an application condition is satisfied, and the next highest priority is applied to an access rule providing the maximum number of data sets which can be acquired (outputted). That is, in the example shown in FIG. 7, application of rule 4 is given the highest priority, and application of rule 7 is given the next highest priority.

Here, consideration will be made on a case where a processing request in the following SQL sentence is made.

Request 4: SELECT * FROM CLIENT WHERE CLIENT NUMBER=0001 AND PASSWORD=AAAA;

When this SQL sentence is analyzed, the kind of processing is readout of data (SELECT); the data readout target column is not specified; the processing target object is "table of clients"; and the values of "client number" and "password" are specified.

With reference to FIG. 7, access rules are checked and rules 1, 2 and 4 are found to be satisfied by the above request 4. However, since the satisfaction degree of rule 1 is the highest here, only rule 1 is applied, and thus rules 2 and 4 are not applied. Rules 5 to 7 may be satisfied, depending on a result of the processing by the processing executing section 150.

Next, when the processing executing section 150 executes the processing based on the request 4, a data set of "client number"="0001" in FIG. 6 is acquired. Since this data set is configured with one row, the application conditions of the rules 6 and 7 are not satisfied. Therefore, the rules 6 and 7 are not applied. On the other hand, the application condition of rule 5 is satisfied, and, therefore, rules 1 and 5 are applied to the processing result. Thereby, the processing result is:

"0001, Ichigo Yasu( ), Tokyo-to, 03-1234-0001, woman, January 1, 6 million, 1234-5678-0001, (NULL)".

That is, the value of "password" is changed to "NULL" (not displayed) from the processing result by the processing executing section 150.

Next, consideration will be made on a case where a processing request in the following SQL sentence is made.

Request 5: SELECT * FROM CLIENT WHERE CLIENT NUMBER=0002;

When this SQL sentence is analyzed, the kind of processing is readout of data (SELECT); the data readout target column is not specified; the processing target object is "table of clients"; and the value of "client number" is specified.

With reference to FIG. 7, access rules are checked and rules 2 and 4 are found to be satisfied by the above request 5. However, since the satisfaction degree of rule 2 is high here, only rule 2 is applied, and thus rule 4 is not applied. Rules 5 to 7 may be satisfied, depending on a result of the processing by the processing executing section 150.

Next, when the processing executing section 150 executes the processing based on the request 5, a data set of "client number"="0002" in FIG. 6 is acquired. Since this data set is configured with one row, the application conditions of rules 6 and 7 are not satisfied. Therefore, rules 6 and 7 are not applied. On the other hand, the application condition of rule 5 is satisfied, and, therefore, rules 2 and 5 are applied to the processing result. Thereby, the processing result is:

"0002, Jiro Ishi ( ) Tokyo-to, 03-XXXX-XXXX, man, February 2, (NULL), (NULL), (NULL)".

That is, from the processing result by the processing executing section 150, "phone number" is masked, and the values of "income", "card number" and "password" have been changed to "NULL" (not displayed).

Next, consideration will be made on a case where a processing request in the following SQL sentence is made.

Request 6: SELECT * FROM CLIENT WHERE ADDRESS=KANAGAWA PREFECTURE;

When this SQL sentence is analyzed, the kind of processing is readout of data (SELECT); the data readout target column is not specified; the processing target object is "table of clients"; and the value of "address" is specified.

With reference to FIG. 7, access rules are checked and rules 3 and 4 are found to be satisfied by the above request 6. However, since the satisfaction degree of rule 3 is high here, only rule 3 is applied, and thus rule 4 is not applied. Rules 5 to 7 may be satisfied, depending on a result of the processing by the processing executing section 150.

Next, when the processing executing section 150 executes the processing based on the request 6, a data set of "client number"="0006" in FIG. 6 is acquired. Since this data set is configured with one row, the application conditions of the rules 6 and 7 are not satisfied. Therefore, rules 6 and 7 are not applied. On the other hand, the application condition of rule 5 is satisfied, and, therefore, rules 3 and 5 are applied to the processing result. Thereby, the processing result is:

"(NULL), (NULL), Kanagawa Prefecture, 03-1234-0006, man, June 6, 10 million, (NULL), (NULL)".

That is, the values of "client number", "name", "card number" and "password" are changed to "NULL" (not displayed) from the processing result by the processing executing section 150.

Next, consideration will be made on a case where a processing request in the following SQL sentence is made.

Request 7: SELECT * FROM CLIENT WHERE ADDRESS=TOKYO-TO;

When this SQL sentence is analyzed, the kind of processing is readout of data (SELECT); the data readout target column is not specified; the processing target object is "table of clients"; and the value of "address" is specified.

With reference to FIG. 7, access rules are checked and rules 3 and 4 are found to be satisfied by the above request 7. However, since the satisfaction degree of the rule 3 is high here, only rule 3 is applied, and thus rule 4 is not applied. Rules 5 to 7 may be satisfied, depending on a result of the processing by the processing executing section 150.

Next, when the processing executing section 150 executes the processing based on the request 7, data sets of "client number"="0001", "0002", "0005" and "0007" in FIG. 6 are acquired. Since the data sets are configured with four rows, the rule 7 is applied first, and the data set of "client number"="0007" on the fourth row is deleted. Next, both of the application conditions of rules 5 and 6 are satisfied, and, therefore, rules 3, 5 and 6 are applied to the processing result. Thereby, the processing result is;

"(NULL), (NULL), Tokyo-to, 03-XXXX-XXXX, woman, January 1, 6 million, (NULL), (NULL);

(NULL), (NULL), Tokyo-to, 03-XXXX-XXXX, man, February 2, 5 million, (NULL), (NULL);

(NULL), (NULL), Tokyo-to, 03-XXXX-XXXX, man, May 5, 5 million, (NULL), (NULL)".

That is, from the processing result by the processing executing section 150, a data set corresponding to one row is deleted; the values of "client number", "name", "card number" and "password" have been changed to "NULL" (not displayed); and "phone number" has been masked.

Next, consideration will be made on a case where a processing request in the following SQL sentence is made.

Request 8: SELECT * FROM CLIENT;

When this SQL sentence is analyzed, the kind of processing is readout of data (SELECT); the data readout target column is not specified; the processing target object is "table of clients"; and none of the values of columns are specified.

With reference to FIG. 7, access rules are checked and rule 4 is found to be satisfied by the above request 8. Rules 5 to 7 may be satisfied, depending on a result of the processing by the processing executing section 150. Here, since the rule 4 is satisfied, the rule 4 is applied with the highest priority. Application of rule 4 is performed prior to execution of the processing by the processing executing section 150. Therefore, the processing by the processing executing section 150 is not executed, and the processing result is "ERROR".

Figure 8:
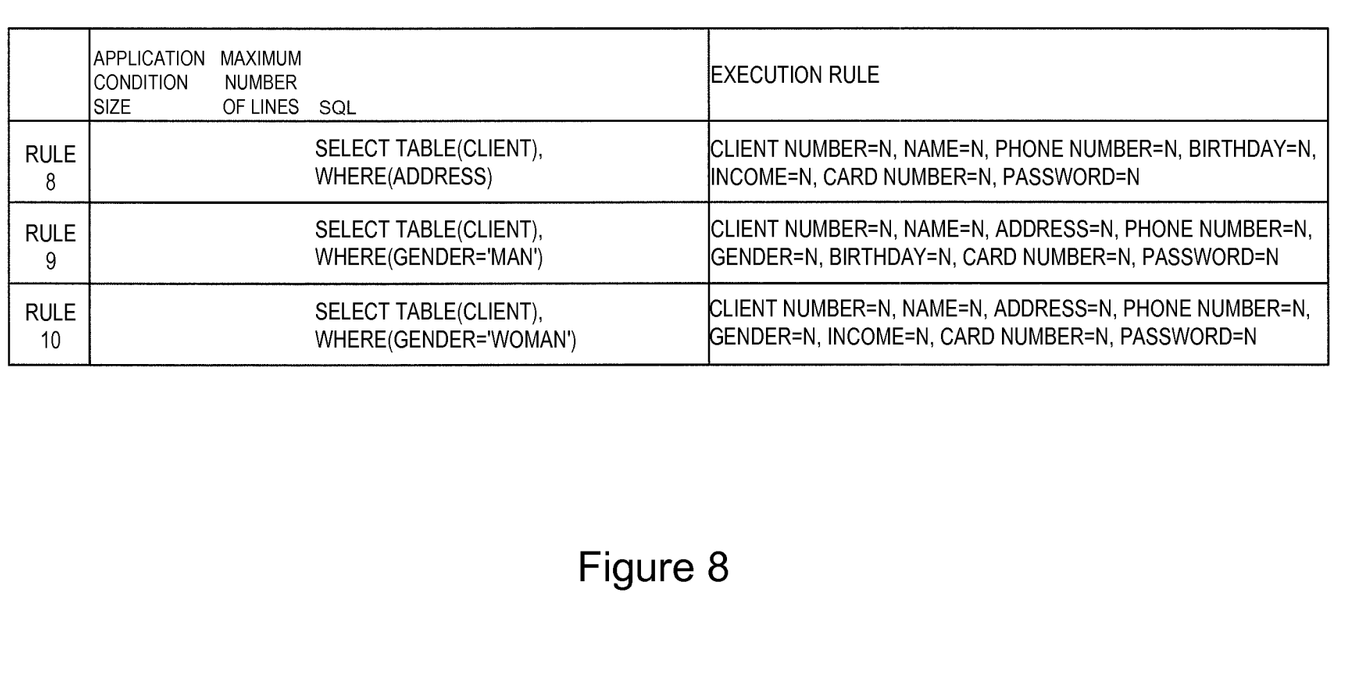
FIG. 8 is a diagram showing a configuration example of access rules used in another application example.

Next, another application example of the present embodiment will be described. The table "table of clients" shown in FIG. 6 is used for an object as a target in the present application example. FIG. 8 shows a configuration example of access rules used in the present application example. For the rules 8 to 10 among the access rules shown in FIG. 8, an application condition regarding specification of a column is set.

The access rules shown in FIG. 8 will be described more specifically. As for rule 8, an execution rule is provided that the values of all the columns except the "address" and "gender" columns are to be "NULL" (not to be displayed) for a readout request specifying the value of "address" and targeting "table of clients" (application condition). As for rule 9, an execution rule is provided that the values of all the columns except the "income" column are to be "NULL" (not to be displayed) for a readout request specifying "man" as the value of "gender" and targeting "table of clients" (application condition). As for rule 10, an execution rule is provided that the values of all the columns except the "birthday" column are to be "NULL" (not to be displayed) for a readout request specifying "woman" as the value of "gender" and targeting "table of clients" (application condition).

Here, consideration will be made on a case where a processing request in the following SQL sentence is made.

Request 9: SELECT * FROM CLIENT WHERE ADDRESS='TOKYO';

When this SQL sentence is analyzed, the kind of processing is readout of data (SELECT); the data readout target column is not specified; the processing target object is "table of clients"; and the value of "address" is specified. With reference to FIG. 8, access rules are checked and rule 8 is found to be satisfied by the above request 9.

Next, when the processing executing section 150 executes the processing based on the request 9, data sets of "client number"="0001", "0002", "0005" and "0007" in FIG. 6 are acquired. Since rule 8 is applied to this result, the processing result is:

"(NULL), (NULL), Tokyo-to, (NULL), woman, (NULL), (NULL), (NULL), (NULL);
(NULL), (NULL), Tokyo-to, (NULL), man, (NULL), (NULL), (NULL), (NULL);
(NULL), (NULL), Tokyo-to, (NULL), man, (NULL), (NULL), (NULL), (NULL);
(NULL), (NULL), Tokyo-to, (NULL), woman, (NULL), (NULL), (NULL), (NULL)".

That is, from the processing result by the processing executing section 150, all the values except the values of "address" and "gender" have been changed to "NULL" (not displayed).

Next, consideration will be made on a case where a processing request in the following SQL sentence is made.

Request 10: SELECT * FROM CLIENT WHERE GENDER='MAN';

When this SQL sentence is analyzed, the kind of processing is readout of data (SELECT); the data readout target column is not specified; the processing target object is "table of clients"; and "man" is specified as the value of "gender". With reference to FIG. 8, access rules are checked and the rule 9 is found to be satisfied by the above request 10.

Next, when the processing executing section 150 executes the processing based on the request 10, data sets of "client number"="0002", "0003", "0004", "0005" and "0006" in FIG. 6 are acquired. Since the rule 9 is applied to this result, the processing result is:

"(NULL), (NULL), (NULL), (NULL), (NULL), (NULL), 5 million, (NULL), (NULL);
(NULL), (NULL), (NULL), (NULL), (NULL), (NULL), 8 million, (NULL), (NULL);
(NULL), (NULL), (NULL), (NULL), (NULL), (NULL), 4.5 million, (NULL), (NULL);
(NULL), (NULL), (NULL), (NULL), (NULL), (NULL), 5 million, (NULL), (NULL);
(NULL), (NULL), (NULL), (NULL), (NULL), (NULL), 10 million, (NULL), (NULL)".

That is, from the processing result by the processing executing section 150, all the values except the value of "income" have been changed to "NULL" (not displayed).

Next, consideration will be made on a case where a processing request in the following SQL sentence is made.

Request 11: SELECT * FROM CLIENT WHERE GENDER='WOMAN';

When this SQL sentence is analyzed, the kind of processing is readout of data (SELECT); the data readout target column is not specified; the processing target object is "table of clients"; and "woman" is specified as the value of "gender". With reference to FIG. 8, access rules are checked and rule 10 is found to be satisfied by the above request 11.

Next, when the processing executing section 150 executes the processing based on the request 11, data sets of "client number"="0001", "0007" in FIG. 6 are acquired. Since the rule 10 is applied to this result, the processing result is:

"(NULL), (NULL), (NULL), (NULL), (NULL), January 1, (NULL), (NULL), (NULL);
(NULL), (NULL), (NULL), (NULL), (NULL), July 7, (NULL), (NULL), (NULL)".

That is, from the processing result by the processing executing section 150, all the values except the value of "birthday" have been changed to "NULL" (not displayed).

Embodiments of the present invention have been described above. The specific configuration of the embodiments of the present invention are not limited to the above examples. For example, an access-target object is not limited to the table and its data components described in the above example. As described above, access rules can be variously set, in addition to the above examples. In addition, what are obtained by making various changes or improvements in the above embodiment are also included within the technical scope of the present invention.

What is claimed is:

1. A method, comprising:
receiving, from a user having an access right to a database object, a processing request;
processing, using the processing request, the database object to generate content;
determining that the processing request meets an application condition for an access rule having an associated execution rule as a mode of processing; and
converting, using the execution rule, the content of the processing to converted content.

2. The method of claim 1, wherein, if the mode of the processing based on the processing request satisfies a predetermined application condition, and the access rule is a rule for making a change so that a result of the processing is not outputted, changing content of the processing comprises canceling execution of the processing.

3. The method of claim 1, wherein, if a mode of readout processing based on a data readout request specifying an item to be read out satisfies a predetermined application condition, and the access rule is a rule for making a change so that a data readout result of a particular item is not outputted, the changing content of the processing comprises changing the readout processing based on the readout request so that a readout of data of the item is not performed.

4. The method of claim 1, wherein, if the mode of the processing based on the processing request satisfies a predetermined application condition, the converting content of the processing comprises outputting, instead of data obtained as a result of the processing, information about the data, in accordance with the access rule.

5. The method of claim 1, wherein, if the mode of the processing based on the processing request satisfies a predetermined application condition, the converting content of the processing comprises deleting data minus a predetermined amount from the data obtained as a result of the processing thereby to output the predetermined amount of data, in accordance with the access rule.

6. A computer hardware system, comprising:
a hardware processor programmed to initiate the following executable operations:
receiving, from a user having an access right to a database object, a processing request;
processing, using the processing request, the database object to generate content;
determining that the processing request meets an application condition for an access rule having an associated execution rule as a mode of processing; and
converting, using the execution rule, the content of the processing to converted content.

7. The system of claim 6, wherein, if the mode of the processing based on the processing request satisfies a predetermined application condition, and the access rule is a rule for making a change so that a result of the processing is not outputted, changing content of the processing comprises canceling execution of the processing.

8. The system of claim 6, wherein, if a mode of readout processing based on a data readout request specifying an item to be read out satisfies a predetermined application condition, and the access rule is a rule for making a change so that a data readout result of a particular item is not outputted, the changing content of the processing comprises changing the readout processing based on the readout request so that a readout of data of the item is not performed.

9. The system of claim 6, wherein, if the mode of the processing based on the processing request satisfies a predetermined application condition, the converting content of the processing comprises outputting, instead of data obtained as a result of the processing, information about the data, in accordance with the access rule.

10. The system of claim 6, wherein, if the mode of the processing based on the processing request satisfies a predetermined application condition, the converting content of the processing comprises deleting data minus a predetermined amount from the data obtained as a result of the processing thereby to output the predetermined amount of data, in accordance with the access rule.

11. A computer program product, comprising:
a hardware storage device having program code stored thereon,
the program code executable, which when executed by a hardware processor, causes the hardware processor to perform:
receiving, from a user having an access right to a database object, a processing request;
processing, using the processing request, the database object to generate content;
determining that the processing request meets an application condition for an access rule having an associated execution rule as a mode of processing; and
converting, using the execution rule, the content of the processing to converted content.

12. The computer program product of claim 11, wherein, if the mode of the processing based on the processing request satisfies a predetermined application condition, and the access rule is a rule for making a change so that a result of the processing is not outputted, changing content of the processing comprises canceling execution of the processing.

13. The computer program product of claim 11, wherein, if a mode of readout processing based on a data readout request specifying an item to be read out satisfies a predetermined application condition, and the access rule is a rule for making a change so that a data readout result of a particular item is not outputted, the changing content of the processing comprises changing the readout processing based on the readout request so that a readout of data of the item is not performed.

14. The computer program product of claim 11, wherein, if the mode of the processing based on the processing request satisfies a predetermined application condition, the converting content of the processing comprises outputting, instead of data obtained as a result of the processing, information about the data, in accordance with the access rule.

15. The computer program product of claim 11, wherein, if the mode of the processing based on the processing request satisfies a predetermined application condition, the converting content of the processing comprises deleting data minus a predetermined amount from the data obtained as a result of the processing thereby to output the predetermined amount of data, in accordance with the access rule.

\* \* \* \* \*